United States Patent
Aoki

(10) Patent No.: US 7,880,868 B2
(45) Date of Patent: Feb. 1, 2011

(54) OPTICAL TIME DOMAIN REFLECTOMETER

(75) Inventor: Shouichi Aoki, Musashino (JP)

(73) Assignee: Yokogawa Electric Corporation, Tokyo (JP)

(*) Notice: Subject to any disclaimer, the term of this patent is extended or adjusted under 35 U.S.C. 154(b) by 56 days.

(21) Appl. No.: 12/239,324

(22) Filed: Sep. 26, 2008

(65) Prior Publication Data

US 2009/0086193 A1 Apr. 2, 2009

(30) Foreign Application Priority Data

Sep. 28, 2007 (JP) ............................. 2007-253793

(51) Int. Cl.
*G01N 21/00* (2006.01)
(52) U.S. Cl. ..................................... 356/73.1
(58) Field of Classification Search .................. None
See application file for complete search history.

(56) References Cited

U.S. PATENT DOCUMENTS

2008/0073485 A1* 3/2008 Jahn et al. ................. 250/201.2

FOREIGN PATENT DOCUMENTS

JP 2001-066221 A 3/2001

* cited by examiner

*Primary Examiner*—Tu T Nguyen
(74) *Attorney, Agent, or Firm*—Sughrue Mion, PLLC

(57) ABSTRACT

An improvement is added to an optical time domain reflectometer for emitting pulsed light of invisible light to a measured optical fiber, receiving return light of the pulsed light by a light detection section, measuring the measured optical fiber, and emitting visible light for visible inspection of a fault point of the measured optical fiber to the measured optical fiber. The optical time domain reflectometer includes an incidence-emission port for emitting the invisible light and the visible light to the measured optical fiber and an output judgment section for judging that a communication light exists in the measured optical fiber based on the light power of the light detection section receiving light incident through the incidence-emission port in a state in which the pulsed light of the invisible light is not emitted.

10 Claims, 4 Drawing Sheets

OPTICAL TIME DOMAIN REFLECTOMETER

TECHNICAL FIELD

The present disclosure relates to an optical time domain reflectometer for emitting pulsed light of invisible light to a measured optical fiber, receiving return light of the pulsed light by a light detection section, measuring the measured optical fiber, and emitting visible light for visible inspection of a fault point of the measured optical fiber to the measured optical fiber. In particular, the present disclosure relates to an optical time domain reflectometer capable of improving the working efficiency of measurement using the return light and measurement using the visible light while suppressing occurrence of a communication failure.

RELATED ART

In an optical communication system for conducting data communications, etc., using an optical signal, it is important to monitor an optical fiber for transmitting an optical signal. An optical time domain reflectometer (OTDR) is used in laying, maintenance, etc., of an optical fiber.

The OTDR measures a state of a break, a loss, etc., of a measured optical fiber by repeatedly emitting pulsed light from an incidence-emission port (a connector end to which an optical fiber to be measured is connected) to the measured optical fiber and measuring the level and the light reception time of reflected light and backscattered light from the measured optical fiber.

A function of finding the loss characteristic, a fault point, etc., of the measured optical fiber based on return light from the measured optical fiber (reflected light and backscattered light of the emitted pulsed light) is called OTDR function. The pulsed light in the OTDR function uses invisible light. For example, a light source for emitting light of a wavelength in a 1310 [nm], 1550 [nm] band, etc., and a light source for emitting light of a wavelength in a 1650 [nm] band as a monitor wavelength are used as the current line for domestic optical communications and generally the user measures at any desired wavelength in response to the use. In the description to follow, the invisible light for the OTDR function is OTDR measurement light and an invisible laser light source, an invisible laser element, etc., is an OTDR laser light source, an OTDR laser element.

Since return light of pulsed light is used for measuring in the OTDR function, it is possible to conduct measurement at a long distance of several [km] to 100 [km] or more as the measurable measured optical fiber distance. The distance refers to the distance from the incidence-emission port of the OTDR.

On the other hand, at a short distance or a close distance (to about 50 [m]) rather than at a long distance, if the user visually inspects the measured optical fiber directly and finds a fault point, conducts maintenance, etc., without using the OTDR function, the working efficiency may be higher.

That is, when light is made incident on the measured optical fiber, if a fault point of a flaw, a broken part, etc., exists in the measured optical fiber, light leaks from the fault point and thus if the light is visible light, the user can easily recognize leakage light and can also find the fault point.

Then, as an optional function of the OTDR, a measurement function including a visible light source for emitting visible light to a measured optical fiber from the OTDR is also available. In this case, return light need not be measured with the OTDR. That is, the visible light emitted to the measured optical fiber from the visible light source of the OTDR leaks from a fault point and thus the user can easily find the fault point by visibly inspecting the leakage light. The function using the visible light source and requiring no return light measurement is called visible light source function.

FIG. 4 is a drawing to show the configuration of an OTDR in a related art. (For example, refer to patent document 1.) In FIG. 4, a measured optical fiber F1 is an optical fiber to be measured where a break, a loss characteristic, etc., is to be measured. An OTDR 100 has an incidence-emission port P1 and an emission port P2 to which the measured optical fiber F1 is connected.

The OTDR 100 emits pulsed light (invisible light) from the port P1 to the measured optical fiber F1 for the OTDR function and return light of the pulsed light (reflected light or backscattered light) is input to the OTDR 100 through the port P1. The OTDR 100 also emits intensity modulation light (visible light) from the port P2 to the measured optical fiber F1 for the visible light source function.

The OTDR 100 further has an OTDR laser drive section 10, an OTDR laser element 11, an optical directional coupler 12, a light detection section 13, a signal processing section 14, a display section 15, a visible laser drive section 16, a visible laser element 17, a control section 18, and a setting section 19.

The OTDR laser drive section 10 drives the OTDR laser element 11 in accordance with a command from the control section 18. The OTDR laser element 11 emits pulsed light driven by the OTDR laser drive section 10. The optical directional coupler 12 emits the pulsed light from the OTDR laser element 11 through the port P1 to the measured optical fiber F1 and emits return light from the measured optical fiber F1 through the port P1 to the light detection section 13.

The light detection section 13 receives the light from the optical directional coupler 12 and converts the light into an electric signal. The electric signal is input from the light detection section 13 to the signal processing section 14. The display section 15 displays the processing result of the signal processing section 14.

The visible laser drive section 16 drives the visible laser element 17 in accordance with a command from the control section 18. The visible laser element 17 emits intensity modulation light driven by the visible laser drive section 16 through the port P2 to the measured optical fiber F1.

The control section 18 performs timing control of emission of the pulsed light of the OTDR laser element 11 through the OTDR laser drive section 10 and timing control of emission of the visible laser element 17 through the visible laser drive section 16 and also causes the signal processing section 14 to perform processing. The setting section 19 sets the control section 18 as to which of the OTDR function and the visible light source function is to be used for measurement.

The operation of the apparatus is as follows;

To begin with, the operation of the OTDR function will be discussed. The user connects the measured optical fiber F1 to the incidence-emission port P1 of the OTDR 100. The setting section 19 sets the control section 18 to the OTDR function as the operation mode based on operation of the user.

The control section 18 issues a command to the OTDR laser drive section 10 and also issues a measurement start command to the signal processing section 14. The signals output by the control section 18 to the OTDR laser drive section 10 and the signal processing section 14 are called timing signals.

Accordingly, the OTDR laser drive section 10 causes the OTDR laser element 11 to emit pulsed light at a predetermined timing in accordance with the timing signal from the control section 18. The pulsed light emitted from the OTDR laser element 11 is incident on the measured optical fiber F1 through the optical directional coupler 12 and the incidence-emission port P1. In the measured optical fiber F1, Rayleigh scattering occurs and a part thereof proceeds in an opposite direction to the traveling direction of the pulsed light and returns to the OTDR 100 as backscattered light. Fresnel reflection light occurring at a connection point, a fault point, etc., of the measured optical fiber F1 also returns to the OTDR 100.

The return light from the measured optical fiber F1 is incident on the light detection section 13 through the port P1 and the optical directional coupler 12. Further, an OE conversion circuit (not shown) of the light detection section 13 converts the incident light into an electric signal (photoelectric current) responsive to the light power of the incident light. An IV conversion circuit (not shown) of the light detection section 13 converts the photoelectric current into a voltage and an amplification circuit (not shown) of the light detection section 13 amplifies the provided voltage too any desired level.

An AD conversion circuit (not shown) of the signal processing section 14 converts an analog signal into a digital signal with the timing signal of the control section 18 as the time base. Further, the signal processing section 14 finds the time between the instant at which the OTDR laser element 11 is caused to emit the pulsed light and the instant at which the light detection section 13 receives the return light based on the input timing of the timing signal and the digital signal provided by the AD conversion circuit, measures the distance of the measured optical fiber F1, and the optical signal level of the return light, computes a loss characteristic and a fault point, and displays the measurement result, the loss characteristic, the fault point, etc., on the display section 15 with the distance on the horizontal axis and the optical signal level of the return light on the vertical axis.

Since the signal level or the return light is very feeble, the pulsed light is repeatedly output to the measured optical fiber F1 and the signal processing section 14 averages the measurement values, thereby reducing noise.

Subsequently, the operation of the visible light source function will be discussed. The user removes the measured optical fiber F1 from the port P1 and connects the measured optical fiber F1 to the emission port P2 of the OTDR 100. The setting section 19 sets the control section 18 to the visible light source function as the operation mode based on operation of the user.

The control section 18 issues a command to the visible laser drive section 16, which then outputs a drive signal of a modulation frequency as commanded to the visible laser element 17. Accordingly, the visible laser element 17 emits modulation light intensity-modulated at a frequency of 2 [Hz], for example, to the measured optical fiber F1 through the port P2. Visible light leaks from a fault point or the measured optical fiber F1 and the fault point blinks.

[Patent document 1] Japanese Patent Laid-Open No. 2001-066221

Thus, to measure the measured optical fiber F1 using the OTDR function, the measured optical fiber F1 is connected to the incidence-emission port P1; to measure the measured optical fiber F1 using the visible light source function, the measured optical fiber F1 is connected to the emission port P2.

However, to switch the mode between the OTDR function and the visible light source function, it is always necessary to switch connection of the measured optical fiber F1 (the incidence-emission port P1 or the emission port P2) and there is a problem of worsening the working efficiency.

In maintenance, etc., of the measured optical fiber F1, the measured optical fiber F1 may be measured in a state in which the communication light for actual optical communications is transmitted to the measured optical fiber F1. In measurement using the visible light source function, measurement of light from the measured optical fiber F1 is not conducted and thus existence of the communication light of the measured optical fiber F1 cannot be checked. Thus, there is a problem of a fear of occurrence of a serious accident causing a communication failure to occur in the optical communication system as visible light is emitted to the measured optical fiber F1 although the communication light is transmitted.

Exemplary embodiments of the present invention provide an optical time domain reflectometer capable of improving the working efficiency of measurement using return light and measurement using visible light while suppressing occurrence of a communication failure.

According to a first invention, there is provided an optical time domain reflectometer for emitting pulsed light of invisible light to a measured optical fiber, receiving return light of the pulsed light by a light detection section, measuring the measured optical fiber, and emitting visible light for visible inspection of a fault point of the measured optical fiber to the measured optical fiber, the optical time domain reflectometer including:

an incidence-emission port for emitting the invisible light and the visible light to the measured optical fiber; and an output judgment section for judging that a communication light exists in the measured optical fiber based on the light power of the light detection section receiving light incident through the incidence-emission port in a state in which the pulsed light of the invisible light is not emitted.

A second invention is characterized by the fact that in the first invention, the optical time domain reflectometer further includes:

a visible laser element for emitting the visible light;

an invisible laser element for emitting the invisible light; and an optical directional coupler for emitting the visible light from the visible laser element and the invisible light from the invisible laser element through the incidence-emission port to the measured optical fiber and emitting light from the measured optical fiber through the incidence-emission port to the light detection section.

A third invention is characterized by the fact that in the first or second invention, the light detection section includes a photodiode having almost no sensitivity to the wavelength of the visible light and having sensitivity to the wavelength of the invisible light.

The invention provides the following advantages:

The invisible light and the visible light are emitted to the measured optical fiber through the identical incidence-emission port. The output judgment section judges that the communication light exists in the measured optical fiber based on the output value of the light power from the light detection section before and while visible light is output or the like, for example. Accordingly, switching connection of the measured optical fiber to the optical time domain reflectometer is eliminated and the working efficiency is improved. In addition, if the communication light exists, output of visible light affecting optical communications of the measured optical fiber is suppressed and a communication failure of the optical communication system can be prevented.

Other features and advantages may be apparent from the following detailed description, the accompanying drawings and the claims.

DETAILED DESCRIPTION

Referring now to the accompanying drawings, there is shown an embodiment of the invention.

Figure 1:
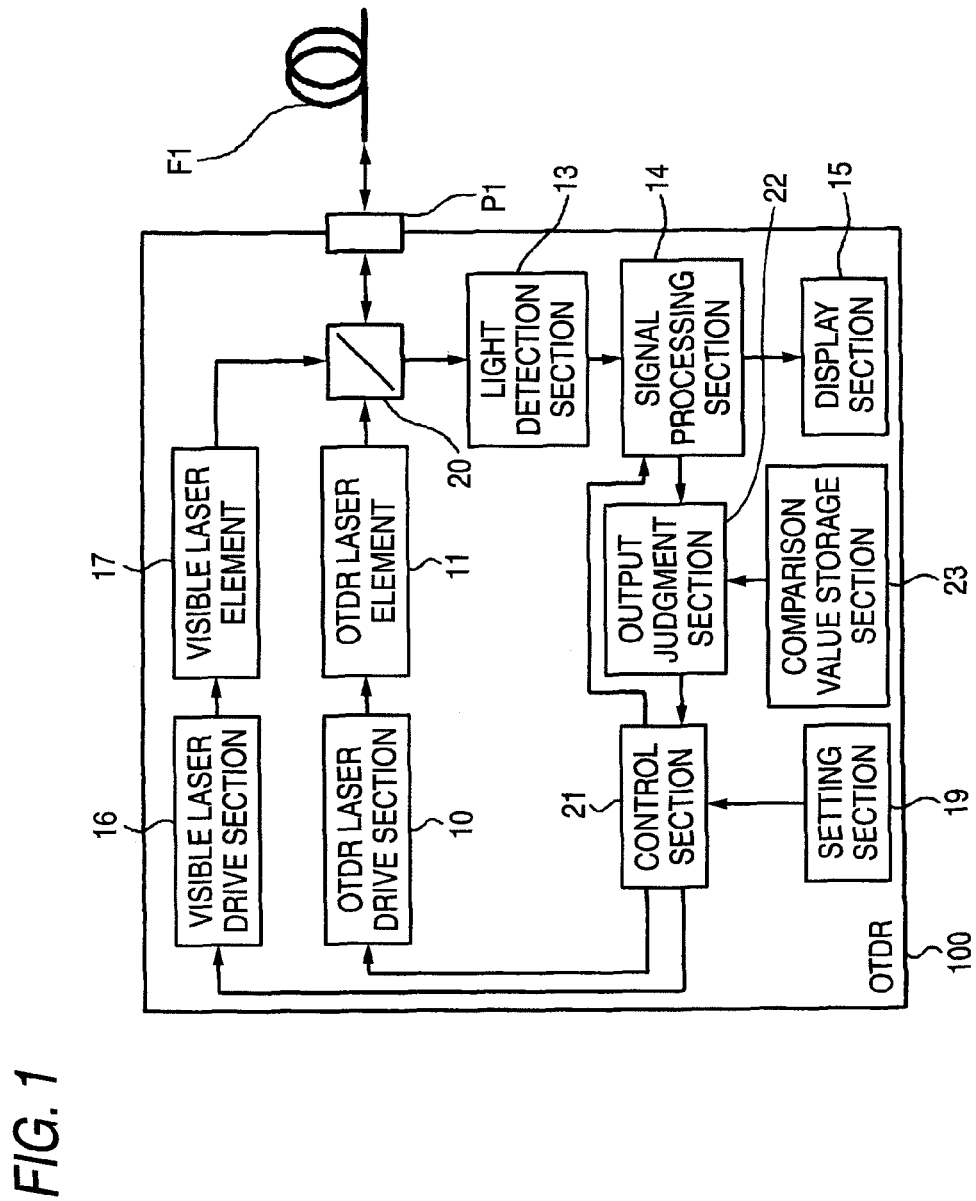
FIG. 1 is a block diagram to show one embodiment of the invention.
Figure 4:
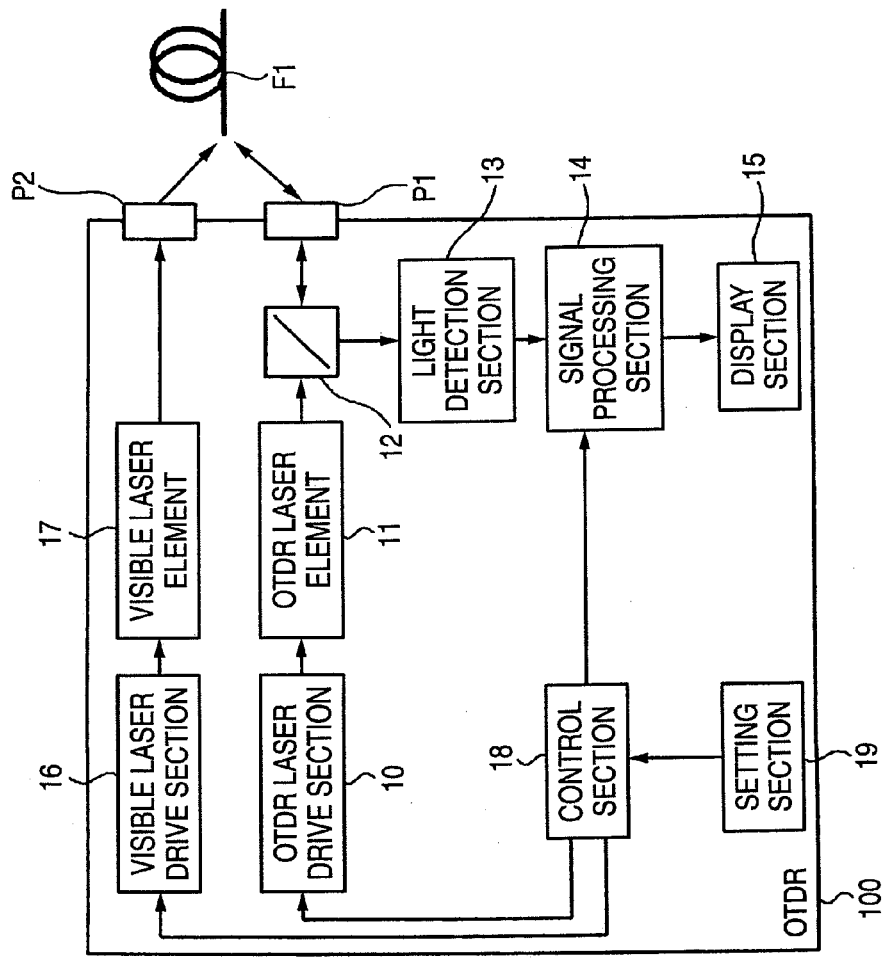
FIG. 4 is a drawing to show the configuration of an optical time domain reflectometer in a related art.

FIG. 1 is a block diagram to show one embodiment of the invention. Components identical with those previously described with reference to FIG. 4 are denoted by the same reference numerals in FIG. 1 and will not be discussed again. In FIG. 1, an optical directional coupler 20 is provided in place of the optical directional coupler 12 and a control section 21 is provided in place of the control section 18. An output judgment section 22 and a comparison value storage section 23 are newly provided and the emission port P2 is removed.

The optical directional coupler 20 emits OTDR measurement light from an OTDR laser element 11 and visible light from a visible laser element 17 through an incidence-emission port P1 to a measured optical fiber F1. The optical directional coupler 20 also emits light incident from the measured optical fiber F1 through the incidence-emission port P1 (return light, communication light, etc.,) to a light detection section 13. That is, both the OTDR measurement light from the OTDR laser element 11 and the visible light from the visible laser element 17 are emitted from the identical incidence-emission port P1 to the measured optical fiber F1.

The control section 21 issues a command to an OTDR laser drive section 10 or a visible laser drive section 16 in accordance with setting from a setting section 19. The control section 21 also issues a command of measurement start, etc., to a signal processing section 14.

The output judgment section 22 reads a comparison value in the comparison value storage section 23, inputs data concerning light power received by the light detection section 13 from the signal processing section 14, and outputs the determination result to the control section 21. The comparison value storage section 23 stores a comparison value to judge the presence or absence of the communication light. As the comparison value, an appropriate value considering the specifications, etc., of an optical communication system is previously stored in the comparison value storage section 23.

As the OTDR laser element 11, it is advisable to use an element for emitting light of a wavelength in a 1310 [nm], 1550 [nm] band, etc., as the current line for domestic optical communications and an element for emitting light of a wavelength in a 1650 [nm] band as a monitor wavelength in response to the use. As the visible laser element 17, it is advisable to select an element for emitting light in a wavelength of a color to easily find a fault point of the measured optical fiber F1 by visual inspection, for example, light of a wavelength of 630 [nm].

The operation of the apparatus is as follows:

To begin with, the operation of the OTDR function will be discussed. The user connects the measured optical fiber F1 to the incidence-emission port P1 of an OTDR 100. The setting section 19 sets the control section 21 to the OTDR function as the operation mode based on operation of the user.

The control section 21 issues a command to the OTDR laser drive section 10 and also issues a measurement start command to the signal processing section 14. The signals output by the control section 21 to the OTDR laser drive section 10 and the signal processing section 14 are called timing signals.

Accordingly, the OTDR laser drive section 10 causes the OTDR laser element 11 to emit pulsed light at a predetermined timing in accordance with the timing signal from the control section 21. The pulsed light emitted from the OTDR laser element 11 is incident on the measured optical fiber F1 through the optical directional coupler 20 and the incidence-emission port P1. In the measured optical fiber F1, Rayleigh scattering occurs and a part thereof proceeds in an opposite direction to the traveling direction of the pulsed light and returns to the OTDR 100 as backscattered light. Fresnel reflection light occurring at a connection point, a fault point, etc., of the measured optical fiber F1 also returns to the OTDR 100.

The return light from the measured optical fiber F1 is incident on the light detection section 13 through the port P1 and the optical directional coupler 20. Further, an OE conversion circuit (not shown) of the light detection section 13 converts the incident light into an electric signal (photoelectric current) responsive to the light power of the incident light. An IV conversion circuit (not shown) of the light detection section 13 converts the photoelectric current into a voltage and an amplification circuit (not shown) of the light detection section 13 amplifies the provided voltage too any desired level.

An AD conversion circuit (not shown) of the signal processing section 14 converts an analog signal into a digital signal with the timing signal of the control section 21 as the time base. Further, the signal processing section 14 finds the time between the instant at which the OTDR laser element 11 is caused to emit the pulsed light and the instant at which the light detection section 13 receives the return light based on the input timing of the timing signal and the digital signal provided by the AD conversion circuit, measures the distance of the measured optical fiber F1 and the optical signal level of the return light, computes a loss characteristic and a fault point, and displays the measurement result, the loss characteristic, the fault point, etc., on a display section 15 with the distance on the horizontal axis and the optical signal level or the return light on the vertical axis.

Since the signal level of the return light is very feeble, the pulsed light is repeatedly output to the measured optical fiber F1 and the signal processing section 14 averages the measurement values, thereby reducing noise.

Subsequently, the operation of the visible light source function will be discussed. The user connects the measured optical fiber F1 to the incidence-emission port P1 as with the OTDR function. Of course, if measurement is to be conducted using the visible light source function successively from the OTDR function, work of connection switching, etc., of the measured optical fiber F1 does not occur. The setting section 19 sets the control section 21 to the visible light source function as the operation mode based on operation of the user.

The control section 21 sends a measurement start command to the signal processing section 14 before visible light is emitted from the visible laser element 17. Accordingly, the AD conversion circuit (not shown) of the signal processing section 14 converts an analog signal of voltage from the light detection section 13 into a digital signal. Of course, the light received at the light detection section 13 is only the communication light because visible light and OTDR measurement light are not emitted from the OTDR 100 to the measured optical fiber F1. The signal processing section 14 finds light power received at the light detection section 13 from the digital signal and outputs the light power to the output judgment section 22.

Further, the output judgment section 22 reads the comparison value (for example, −40 [dBm]) from the comparison value storage section 23 and makes a comparison between the output value of the light power from the signal processing section 14 and the comparison value. If the output value of the light power is larger than the comparison value, the output judgment section 22 judges that the communication light exists in the measured optical fiber F1, and outputs the determination result to the control section 21. Based on the determination result, the control section 21 displays a warning on the display section 15 through the signal processing section 14 and prohibits the visible laser drive section 16 to drive the visible laser element 17.

On the other hand, if the output value of the light power is smaller than the comparison value, the output judgment section 22 judges that the communication light does not exist in the measured optical fiber F1, and outputs the determination result to the control section 21. Based on the determination result, the control section 21 issues a command to the visible laser drive section 16. The visible laser drive section 16 outputs a drive signal of a modulation frequency as commanded to the visible laser element 17. Accordingly, the visible laser element 17 emits modulation light intensity-modulated at a frequency of 2 [Hz], for example, to the measured optical fiber F1 through the optical directional coupler 20 and the incidence-emission port P1. Visible light leaks from a fault point of the measured optical fiber F1 and the fault point blinks. Thus, the user can easily acknowledge the fault point of the measured optical fiber F1 by visual inspection.

Further, if the visible laser element 17 is emitting visible light, the control section 21 sends a measurement start command to the signal processing section 14 in a predetermined period. Accordingly, the AD conversion circuit (not shown) of the signal processing section 14 converts an analog signal of voltage from the light detection section 13 into a digital signal. The signal processing section 14 finds light power received at the light detection section 13 from the digital signal and outputs the light power to the output judgment section 22. Further, the output judgment section 22 makes a comparison between the output value of the light power received during visible light output and the comparison value. If the output value of the light power is larger than the comparison value, the output judgment section 22 judges that the communication light exists in the measured optical fiber F1, and outputs the determination result to the control section 21. Based on the determination result, the control section 21 displays a warning on the display section 15 through the signal processing section 14 and causes the visible laser drive section 16 to immediately stop driving the visible laser element 17.

If the visible laser element 17 is outputting visible light, the light detection section 13 receives return light of the visible light from the measured optical fiber F1. Then, it is advisable to use an element made of InGaAs, for example, as a light reception element (photodiode) of a kind of the OE conversion circuit of the light detection section 13. That is, the photodiode made of InGaAs has almost no light reception sensitivity to the wavelength of the visible light of the visible laser element 17 and has sensitivity to OTDR measurement light of the OTDR laser element and therefore the light received at the light detection section 13 becomes the communication light only. The expression "almost no sensitivity" is used to mean that light is scarcely converted into photocurrent through the light reception element; for example, the sensitivity difference between the wavelength of the visible light and the wavelength of OTDR measurement light is 20 [dB] or more.

A wavelength filter for allowing only invisible light to pass through may be provided between the optical directional coupler 20 and the light detection section 13.

Thus, the optical directional coupler 20 emits the OTDR measurement light from the OTDR laser element 11 and the visible light from the visible laser element 17 to the measured optical fiber F1 through the identical incidence-emission port P1. Accordingly, the need for switching connection of the measured optical fiber F1 to the port P1 or P2 between the OTDR function and the visible light source function as shown in FIG. 4 is eliminated. Therefore, the working efficiency can be improved.

In a state in which the pulsed light of OTDR measurement light is not emitted, namely, in the operation mode of the visible light source function, the output judgment section 22 judges that the communication light exists in the measured optical fiber F1 based on the output value of the light power from the light detection section 13, the signal processing section 14 before and while the visible laser element 17 outputs visible light. Based on the determination result, the control section 21 causes the visible laser drive section 16 to stop emission of the visible light of the visible laser element 17. Accordingly, a communication failure of the optical communication system can be prevented.

Figure 2:
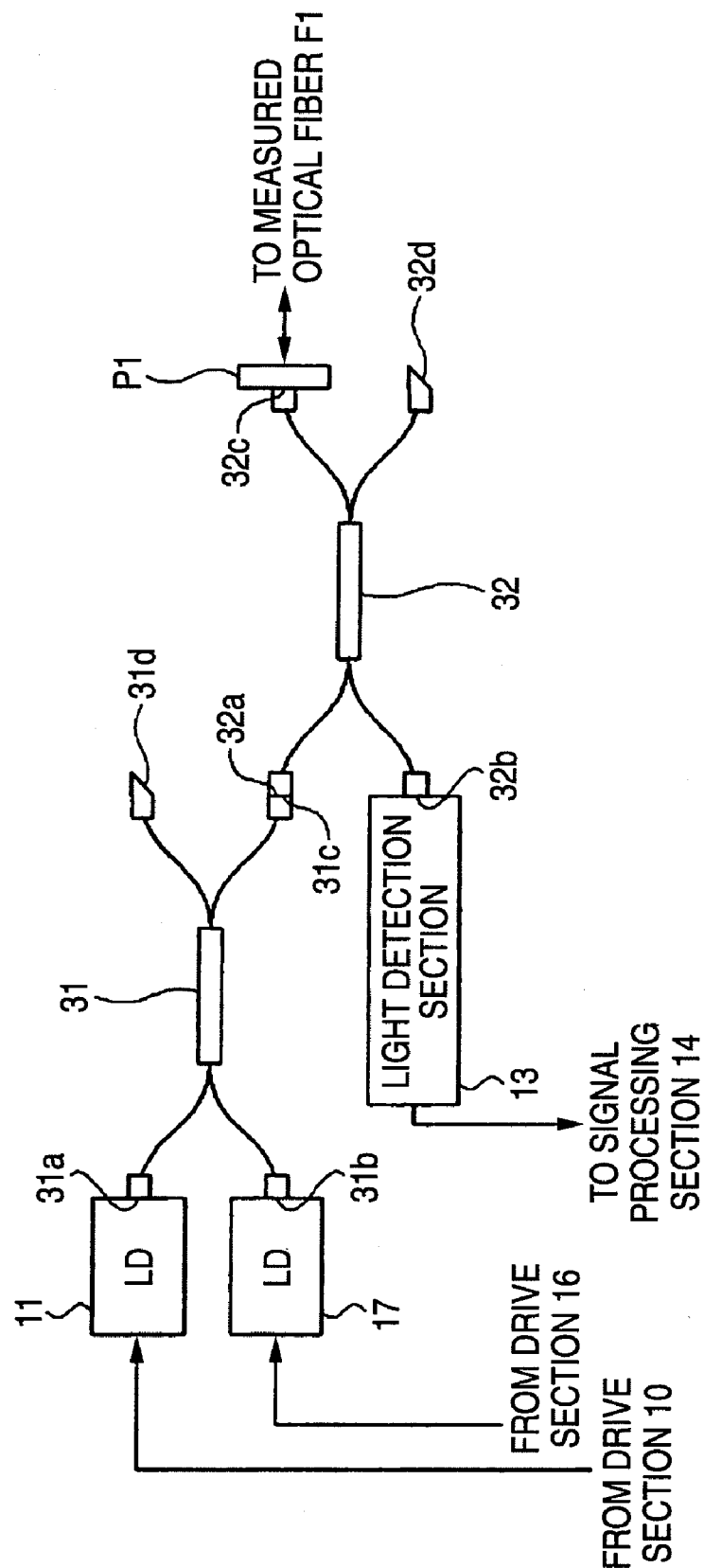
FIG. 2 is a block diagram of an optical directional coupler of the apparatus shown in FIG. 1.

Subsequently, FIG. 2 is a block diagram to show an embodiment of the optical directional coupler 20. Components identical with those previously described with reference to FIG. 1 are denoted by the same reference numerals in FIG. 2 and will not be discussed again. In FIG. 2, an optical coupler 31 is an optical multiplexing section for multiplexing light of different wavelengths and is two inputs and two outputs. An optical coupler 32 is a coupling section for emitting the light provided by the optical coupler 31 of the optical multiplexing section to the measured optical fiber F1 and transmitting light from the measured optical fiber F1 to the light detection section 13 and is two inputs and two outputs.

The optical coupler 31 is effective for maintaining the performance of the OTDR function by setting OTDR measurement light:visible light≦about 9:1 considering the wavelength difference between the laser elements 11 and 17 (for example, 1550 [nm] and 630 [nm]).

The optical directional coupler will be discussed in detail with FIG. 2.

Pulsed light of the OTDR laser element 11 is incident on one input end 31a of the optical coupler 31 and visible light of the visible laser element 17 is incident on another input end 31b. The light from the laser element 11 and the light from the laser element 17 are multiplexed and the resultant light is incident on one input end 32a of the optical coupler 32 from one output end 31c of the optical coupler 31. Further, the light incident on the optical coupler 32 is emitted from one output end 32c of the optical coupler 32 through the incidence-emission port P1 to the measured optical fiber F1.

Return light, the communication light, etc., from the measured optical fiber F1 is incident from the output end 32c of the optical coupler 32 through the incidence-emission port P1 and is emitted from another input terminal 32b and is received at a light reception element (not shown) of the light detection section 13.

Another output end 31d of the optical coupler 31 and another output end 32d of the optical coupler 32 are treated so as to become non-reflected ends. One output end 32c of the optical coupler 32 and the measured optical fiber F1 are connected by the incidence-emission port (optical fiber connector) P1. A lens for gathering the light from the laser element 11 and coupling at the input end 31a of the optical coupler 31, a lens for gathering the light from the laser element 17 and coupling at the input end 31b of the optical coupler 31, a lens for gathering the light from the input end 32b of the optical coupler 32 and coupling at the light reception element, and the like are not shown in the figure.

Figure 3:
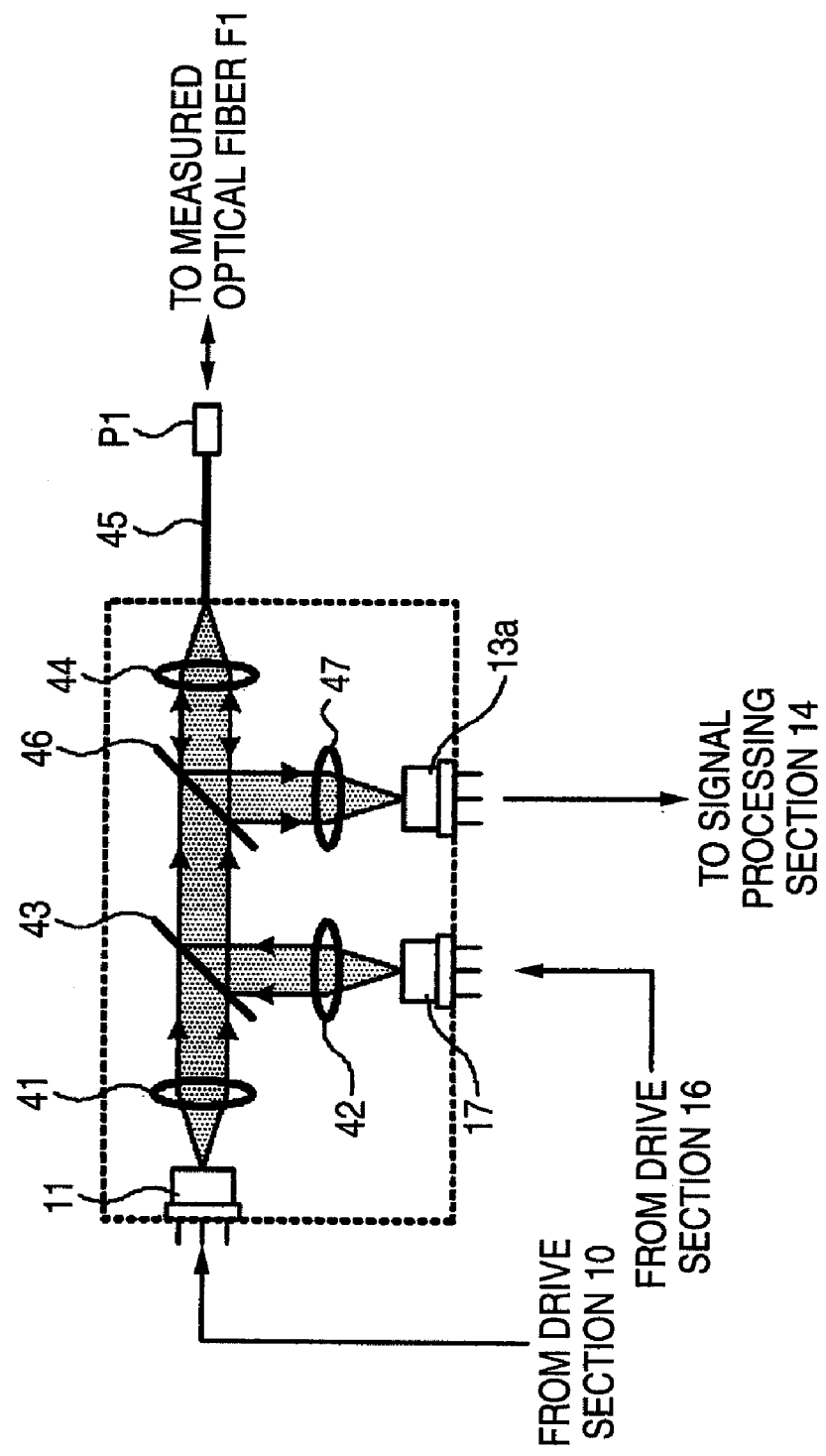
FIG. 3 is a block diagram of another embodiment of the optical directional coupler of the apparatus shown in FIG. 1.

FIG. 3 is a block diagram to show another embodiment of the optical directional coupler 20. The optical couplers are used in FIG. 2; space is used in FIG. 3 in place of the optical couplers. Components identical with those previously described with reference to FIG. 1 are denoted by the same reference numerals in FIG. 3 and will not be discussed again.

In FIG. 3, a lens 41 converts the pulsed light (1550 [nm] band) from the OTDR laser element 11 into parallel rays. A lens 42 converts the pulsed light (630 [nm] band) from the visible laser element 17 into parallel rays. An optical multiplexing-demultiplexing filter (optical multiplexing section) 43 multiplexes OTDR measurement light and visible light from the lenses 41 and 42. A lens 44 gathers light from the optical multiplexing-demultiplexing filter 43. A first optical fiber 45 has one end provided at the light gathering position of the lens 44 and an opposite end connected to the measured optical fiber F1 through the incidence-emission port (optical fiber connector) P1. A beam splitter (BS) 46 is a coupling section and is provided between the optical multiplexing-demultiplexing filter 43 and the lens 44. A lens 47 gathers light split through the BS 46. A light reception element 13a of the light detection section 13 (for example, photodiode made of InGaAs) is provided at the light gathering position of the lens 47 and receives light from the measured optical fiber F1 (return light, communication light, etc.,).

The operation of the apparatus is as follows:

The pulsed light from the OTDR laser element 11 becomes parallel rays through the lens 41. Intensity modulation light of visible light from the visible laser element 17 becomes parallel rays through the lens 42. The optical multiplexing-demultiplexing filter 43 allows the light from the OTDR laser element 11 to pass through and reflects the light from the visible laser element 17 and emits the light to the BS 46. Further, the passing-through light (light from the OTDR laser element 11) and the reflected light (light from the visible laser element 17) from the optical multiplexing-demultiplexing filter 43 pass through the BS 46 and are gathered through the lens 44 and the gathered light is incident on one end of the first optical fiber 45.

The light incident on one end of the first optical fiber 45 is incident on the measured optical fiber F1 through the opposite end of the first optical fiber 45 and the incidence-emission port P1.

On the other hand, the return light, the communication light, etc., from the measured optical fiber F1 is incident on the incidence-emission port P1 and the opposite end of the first optical fiber 45. Further, the return light, the communication light, etc., emitted from one end of the first optical fiber 45 becomes parallel rays through the lens 44 and the parallel rays are split by the BS 46. Of the split light rays, the light reflected in the direction of the lens 47 is gathered through the lens 47 and is received at the light reception element 13a. Further, the light reception element 13a converts the incident light into an electric signal (photocurrent) responsive to the light power of the light and outputs the electric signal to the IV conversion circuit at the following stage.

The invention is not limited to the apparatus described above and may be as follows:

In the apparatus shown in FIG. 1, the visible laser element 17 outputs visible light intensity-modulated at a frequency of 2 [Hz], but the modulation frequency may be any value and visible light of constant light power on the time basis without undergoing intensity modulation may be output.

In the apparatus shown in FIG. 1, in a state in which OTDR measurement light is not emitted, namely, in the operation mode of the visible light source function, it the output judgment section 22 judges that the communication light exists in the measured optical fiber F1 before and while visible light is output, the control section 21 causes the visible laser drive section 16 to stop driving the visible laser element 17 so as not to emit the visible light. However, if it is judged that the communication light exists in the measured optical fiber F1, visible light may be emitted to the measured optical fiber F1. That is, the control section 21 causes through the visible laser drive section 16, the visible laser element 17 to emit visible light at such an optical signal level to suppress occurrence of a communication failure in the optical communication system of the measured optical fiber F1 (for example, optical signal level of about 10 [mW]).

Thus, if the communication light exists, the control section 21 controls the visible laser element 17 for causing the visible laser element 17 to emit visible light at such an optical signal level not affecting the optical communication system. Accordingly, if the communication light enters the measured optical fiber F1 before and while the visible laser element 17 emits light, while a communication failure is prevented, the user can find a fault point of the measured optical fiber F1 by visual inspection and the working efficiency can be improved.

In the apparatus shown in FIG. 2, the ratio of the optical coupler 31 as the optical multiplexing section is set to OTDR measurement light:visible light=about 9:1. However, to suppress the cost, the percentage of the visible light may be increased.

In the apparatus shown in FIG. 2, an optical circulator may be used in place of the optical coupler 32 as the coupling section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical time domain reflectometer comprising:
   an incidence-emission port for emitting pulsed light of invisible light and visible light for visible inspection of a fault point of a measured optical fiber to the measured optical fiber;
   a light detection section for receiving light from the measured optical fiber through said incidence-emission port; and
   an output judgment section for judging that a communication light exists in the measured optical fiber based on a light power of the light detection section receiving light incident through said incidence-emission port in a state in which the pulsed light of the invisible light is not emitted.

2. The optical time domain reflectometer as claimed in claim 1 further comprising:
   a visible laser element for emitting the visible light;
   an invisible laser element for emitting the invisible light; and an optical directional coupler for emitting the visible light from the visible laser element and the invisible light from the invisible laser element through said incidence-emission port to the measured optical fiber and emitting light from the measured optical fiber through said incidence-emission port to the light detection section.

3. The optical time domain reflectometer as claimed in claim 2 wherein the light detection section comprises a photodiode having almost no sensitivity to a wavelength of the visible light and having sensitivity to a wavelength of the invisible light.

4. The optical time domain reflectometer as claimed in claim 2 further comprising;
a wavelength filter provided between the optical directional coupler and the light detection section, for allowing only invisible light to pass through.

5. The optical time domain reflectometer as claimed in claim 1 wherein the light detection section comprises a photodiode having almost no sensitivity to a wavelength of the visible light and having sensitivity to a wavelength of the invisible light.

6. An optical time domain reflectometer comprising:
an incidence-emission port for emitting pulsed light of invisible light and visible light for visible inspection of a fault point of a measured optical fiber to the measured optical fiber;
a light detection section for receiving light from the measured optical fiber through said incidence-emission port; and
an output judgment section for judging that a communication light exists in the measured optical fiber based on a light power of the light detection section receiving light incident through said incidence-emission port in a state in which the pulsed light of the invisible light is not emitted,
wherein the output judgment section comprises a comparison value storage section which stores a comparison value to judge the presence or absence of the communication light, and the output judgment section reads a comparison value in the comparison value storage section and makes a comparison between the light power from the light detection section and the comparison value to judge that the communication light exists in the measured optical fiber.

7. An optical time domain reflectometer comprising:
a port for receiving light from an optical fiber to be measured;
a laser drive section that is optically coupled to the port and emits into the port pulsed light of invisible light and visible light;
a light detection section that is optically coupled to the port and that detects a light power of light received through the port; and
an output judgment section that determines whether a communication light exists at the port based on the light power of incident light received through the port in a state in which the pulsed light of the invisible light is not emitted.

8. The optical time domain reflectometer according to claim 7, further comprising an optical coupler that optically couples the laser drive section and the light detection section to the port.

9. The optical time domain reflectometer according to claim 7, wherein the output judgment section comprises a comparison value storage section which stores a comparison value, and
the output judgment section reads the comparison value and compares the light power and the comparison value to determine that the communication light exists.

10. An optical time domain reflectometer comprising:
an incidence-emission port that emits pulsed light of invisible light and visible light for visible inspection of a fault point of a measured optical fiber to the measured optical fiber;
a light detection section that receives light from the measured optical fiber through said incidence-emission port;
an output judgment section that determines whether communication light exists in the measured optical fiber based on a light power of the light detection section receiving light incident through said incidence-emission port in a state in which the pulsed light of the invisible light is not emitted, and
a control section that stops emission of the visible light from the incidence-emission port to the measured optical fiber based on the determination result of the output judgment section.

* * * * *